United States Patent [19]
Rayford

[11] Patent Number: 6,000,717
[45] Date of Patent: Dec. 14, 1999

[54] VEHICLE OCCUPANT PROTECTION APPARATUS

[75] Inventor: Joan Rayford, Livonia, Mich.

[73] Assignee: TRW Inc., Lyndhurst, Ohio

[21] Appl. No.: 09/007,746

[22] Filed: Jan. 15, 1998

[51] Int. Cl.$^6$ .............................. B60R 21/32; A47C 1/10
[52] U.S. Cl. ........................................... 280/735; 297/410
[58] Field of Search ............................ 280/735; 180/271, 180/274; 297/410

[56] References Cited

U.S. PATENT DOCUMENTS

| | | | |
|---|---|---|---|
| 5,254,924 | 10/1993 | Ogasawara | 318/590 |
| 5,398,185 | 3/1995 | Omura . | |
| 5,670,853 | 9/1997 | Bauer . | |
| 5,748,473 | 5/1998 | Breed et al. | 364/424.055 |
| 5,803,491 | 9/1998 | Barnes et al. | 280/735 |

*Primary Examiner*—Christopher P. Ellis
*Assistant Examiner*—Faye M. Fleming
*Attorney, Agent, or Firm*—Tarolli, Sundheim, Covell, Tummino & Szabo

[57] ABSTRACT

An apparatus (10) encloses a movable vehicle seat (12) and an inflatable vehicle occupant protection device (14) which is inflatable into engagement with an occupant of the seat (12). An electric motor (42) is operatively connected to the seat (12) to move the seat (12) when the motor (42) is actuated. A first actuating means (50) actuates the motor (42) in response to input from the occupant so as to move the seat (12) to a position selected by the occupant. A second actuating means (92) actuates the motor (42) in response to crash conditions so as to move the seat (12) with reference to the crash conditions.

4 Claims, 1 Drawing Sheet

6,000,717

VEHICLE OCCUPANT PROTECTION APPARATUS

FIELD OF THE INVENTION

The present invention relates to an apparatus for inflating an inflatable vehicle occupant protection device.

BACKGROUND OF THE INVENTION

An inflatable vehicle occupant protection device, such as an air bag, is inflated upon the occurrence of a vehicle crash. The air bag is part of a vehicle occupant protection apparatus which further includes a crash sensor and an inflator. The crash sensor senses vehicle conditions that indicate the occurrence of a crash. When the crash sensor senses a crash-indicating condition of at least a predetermined threshold level, the inflator is actuated. The inflator then emits inflation fluid which inflates the air bag into the vehicle occupant compartment. When the air bag is inflated in this manner, it engages an occupant of the vehicle to help protect the occupant from a forceful impact with parts of the vehicle as a result of the crash.

The manner in which the air bag engages the vehicle occupant can be influenced by factors such as the force with which the occupant moves against the air bag and the pressure of the inflation fluid in the air bag. Those factors, in turn, can be influenced by various conditions that exist at the time of the crash. Such crash conditions may include deceleration or other vehicle conditions, and/or vehicle occupant conditions such as the weight and position of the occupant.

SUMMARY OF THE INVENTION

In accordance with the present invention, an apparatus comprises a movable vehicle seat and a vehicle occupant protection device which is inflatable into engagement with an occupant of the seat. An electric motor is operatively connected to the seat. A first actuating means actuates the motor in response to input from the occupant so as to move the seat to a position selected by the occupant. A second actuating means actuates the motor in response to crash conditions so as to move the seat with reference to the crash conditions.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein.

DESCRIPTION OF A PREFERRED EMBODIMENT

Figure 1:
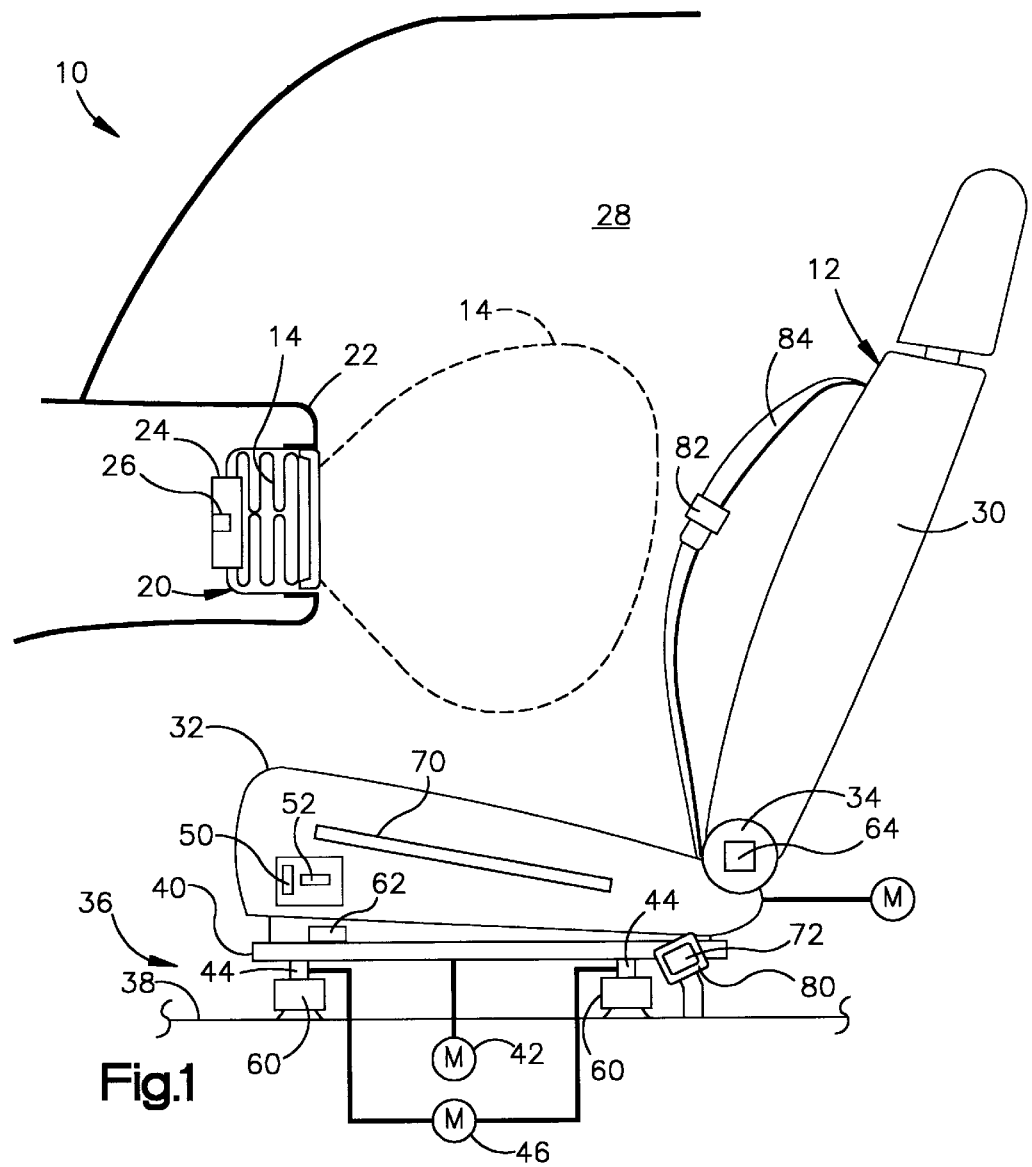
FIG. 1 is a schematic view of an apparatus comprising a preferred embodiment of the present invention.

An apparatus 10 comprising a preferred embodiment of the present invention is shown schematically in FIG. 1. The apparatus 10 includes a vehicle seat 12 and an inflatable vehicle occupant protection device 14. The seat 12 is movable relative to the protection device 14 in accordance with the present invention.

The protection device 14 in the preferred embodiment of the present invention is a particular type of inflatable device which is known as an air bag, and is part of an air bag module 20 which is mounted in the vehicle instrument panel 22. However, the present invention is also applicable to an air bag module that is mounted on a vehicle steering column or at any other suitable location in the vehicle. The invention is likewise applicable to other inflatable vehicle occupant protection devices such as, for example, inflatable knee bolsters, inflatable head liners or side curtains, and knee bolsters operated by inflatable air bags. Each of these other protection devices would be mounted in the vehicle at a corresponding location appropriate for helping to protect an occupant of the seat 12, as known in the art.

In addition to the air bag 14, the module 20 includes an inflator 24 with an electrically actuatable initiator 26. The inflator 24 may contain a stored quantity of pressurized inflation fluid. The inflator 24 may alternatively contain a body of ignitable gas generating material or a combination of pressurized inflation fluid and ignitable material for heating the inflation fluid. When the initiator 26 is actuated, it initiates an outlet flow of inflation fluid from the inflator 24. The inflation fluid inflates the air bag 14 from a stored condition, as shown in solid lines in FIG. 1, to an inflated condition, as shown in dashed lines in FIG. 1. The air bag 14 can then engage an occupant of the seat 12 to restraint movement of the occupant within the vehicle occupant compartment 28, and thereby to help protect the occupant from a forceful impact with the instrument panel 22 or other parts of the vehicle.

The seat 12 includes a seat back 30 and a seat cushion 32. A recliner assembly 34 supports the seat back 30 for inclination relative to the seat cushion 32. The recliner assembly 34 may be either motorized or manually operated, as known in the art. A motorized support structure 36 supports the seat cushion 32, and hence the entire seat 12, for movement both vertically and horizontally in the vehicle occupant compartment 28.

The support structure 36 includes a horizontally adjustable rail assembly 40 with at least one electric motor 42. The support structure 36 further includes a plurality of vertically adjustable support members 44 with at least one electric motor 46. An occupant of the seat 12 can actuate the motor 42 to move the seat cushion 32 in fore and aft directions by the use of a pushbutton 50. The occupant can actuate the other motor 46 to move the seat 12 vertically by the use of a corresponding pushbutton 52.

A plurality of sensors are mounted on the seat 12. These include height sensors 60, a fore and aft position sensor 62, and an inclination sensor 64. The height sensors 60, which may comprise linear potentiometers or linear voltage differential transformers, are operatively connected with the support members 44 to provide electrical signals indicating the vertical position of the seat cushion 32. The fore and aft position sensor 62, which also may comprise a linear potentiometer or a linear voltage differential transformer, is operatively connected with the rail assembly 40 to provide an electrical signal indicating the fore and aft position of the seat cushion 32. The inclination sensor 64 is operatively connected to the recliner assembly 34 to provide an electrical signal indicating the inclination of the seat back 30. Preferably, the inclination sensor 64 comprises a rotary potentiometer.

Other sensors shown in FIG. 1 include a weight sensor 70 in the seat 12 and a locking sensor 72 in a buckle 80 beside the seat 12. The weight sensor 70 provides an electrical signal indicating the vehicle occupant weight load acting on the seat cushion 32. The locking sensor 72 provides an electrical signal indicating whether or not a tongue 82 on the occupant's seat belt webbing 84 is locked in the buckle 80. Each of these sensors 70 and 72 may comprise any suitable sensing device known in the art.

Figure 2:
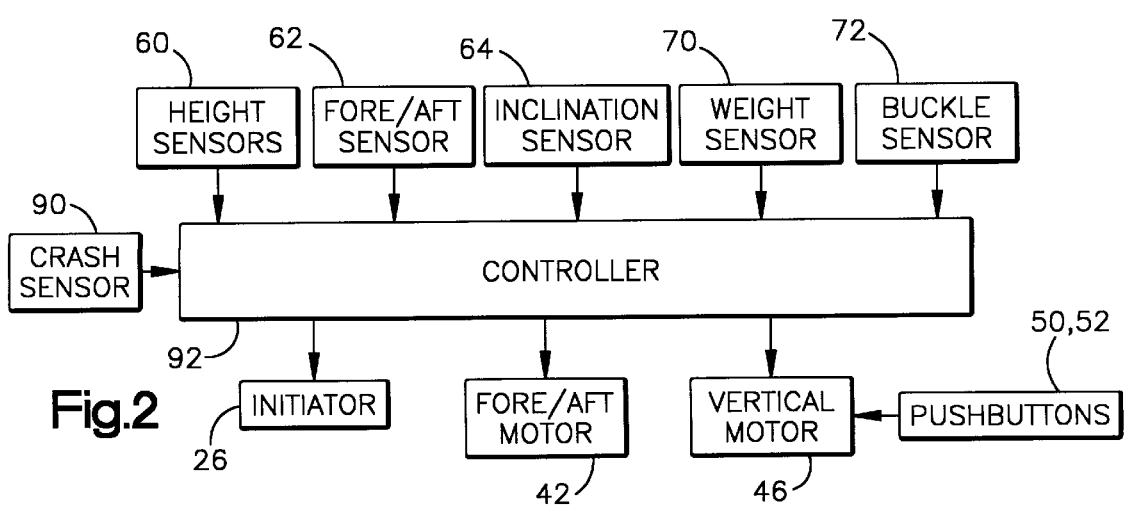
FIG. 2 is a block diagram of parts of the apparatus of FIG. 1.

As shown in FIG. 2, the apparatus 10 further includes a crash sensor 90 and an electronic controller 92. The crash sensor 90 is a known device that senses a vehicle condition indicating the occurrence of a crash. Such a condition may comprise, for example, vehicle deceleration that is caused by a crash. If the crash-indicating condition meets or exceeds a predetermined threshold level, it indicates the occurrence of a crash for which inflation of the air bag 14 is desired to help protect an occupant of the seat 12. The crash sensor 90 then provides the controller 92 with an appropriate crash signal. The controller 92, which may comprise a microprocessor of known construction, responds by actuating the initiator 26 at the inflator 24 (FIG. 1). This initiates an outlet flow of inflation fluid for inflation of the air bag 14, as described above.

The controller 92 may further respond to the crash sensor 90 by actuating the motors 42 and 46 at the seat 12. The controller 92 may thus cause the seat 12 to be moved relative to the air bag 14 to control the manner in which the air bag 14 engages an occupant of the seat 12. This may be desirable for protection of a light weight occupant, an occupant who is seated relatively close to the instrument panel 22, and/or an occupant who is not wearing the seat belt webbing 84. The sensors 60–64, 70 and 72 in the vehicle occupant compartment 28 indicate such conditions to the controller 92. When one or more of those conditions are indicated at the time of a crash, the controller 92 may respond by actuating one or more of the motors 42 and 46 to move the seat 12 in a corresponding manner.

For example, the signals provided by the weight sensor 70 and the fore and aft position sensor 62 could indicate that a light weight occupant is seated relatively close to the air bag module 20 in the instrument panel 22. If those conditions exist when the crash sensor 90 provides a signal calling for inflation of the air bag 14, the controller 92 can actuate the motor 42 at the rail assembly 40 to move the seat 12 in the aft direction. Such movement of the seat 12 would tend to move the occupant away from the inflating air bag 14 to lessen the force with which the inflating air bag 14 engages the occupant.

The present invention has been described with reference to a preferred embodiment. From the foregoing description, those skilled in the art will perceive improvements, changes and modifications. For example, the controller 92 could respond to crash conditions other than those indicated by the sensors 60–64, 70, 72 and 90 described above. The apparatus 10 could further include a vent or other means for varying the inflation fluid pressure in the air bag 14 in response to any one or more of the sensed crash conditions. The inflation fluid pressure could be used as a parameter that affects the manner in which the seat 12 is moved relative to the inflating air bag 14. Such improvements, changes and modifications within the skill of the art are intended to be covered by the appended claims.

Having described the invention, the following is claimed:

1. Apparatus comprising:

a movable vehicle seat;

an inflatable vehicle occupant protection device which is inflatable into engagement with an occupant of said seat;

an electric motor which is operatively connected to said seat to move said seat when said motor is actuated;

first actuating means for actuating said motor in response to input from the occupant so as to move said seat to a position selected by the occupant; and second actuating means for actuating said motor in response to crash conditions so as to move said seat with reference to said crash conditions.

2. Apparatus as defined in claim 1 wherein said motor is one of a plurality of motors which are operatively connected to said seat to move said seat in a corresponding plurality of directions, said second actuating means selecting and actuating one or more of said motors so as to move said seat in a corresponding one or more of said directions in response to said crash conditions.

3. Apparatus as defined in claim 2 wherein said protection device is mounted at a location spaced from said seat and is inflatable toward said seat, said directions including a direction extending away from said protection device.

4. Apparatus as defined in claim 3 wherein said crash conditions comprise a vehicle condition and a vehicle occupant condition.

\* \* \* \* \*